Patented Nov. 17, 1931

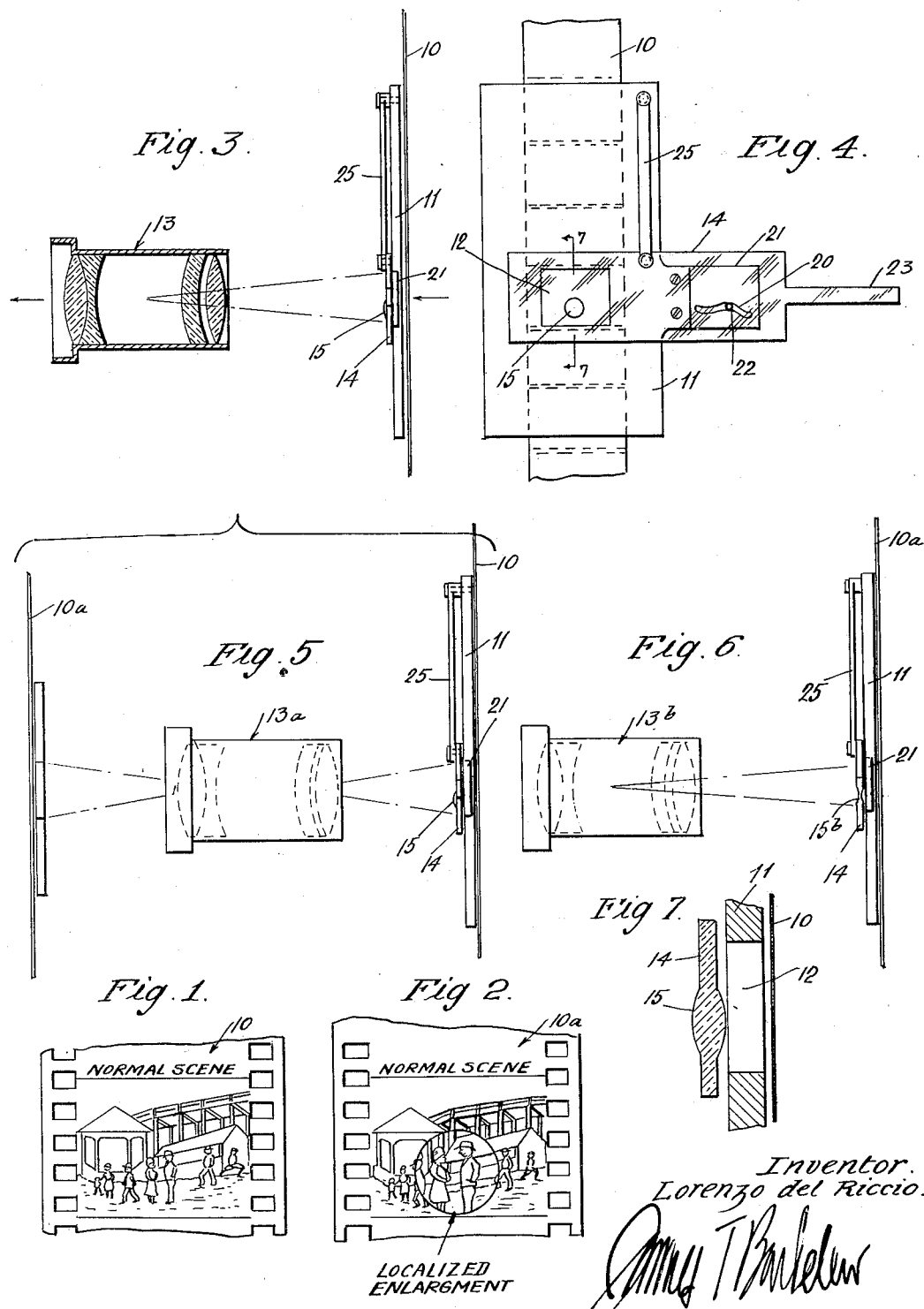

1,832,739

UNITED STATES PATENT OFFICE

LORENZO DEL RICCIO, OF LOS ANGELES, CALIFORNIA, ASSIGNOR TO PARAMOUNT PUBLIX CORPORATION, OF NEW YORK, N. Y., A CORPORATION OF NEW YORK

APPARATUS FOR PRODUCING MOTION PICTURES

Application filed June 18, 1927. Serial No. 199,667.

This invention has to do with taking or projecting pictures; and although not limited in its application to motion pictures, is most useful in connection with motion pictures and therefore will be explained as so applied.

The general object of the invention is to provide a system and means whereby an enlargement, or in fact any desired distortion of a limited portion of the picture may be obtained. Although various kinds of distortions of a limited part of a picture may be obtained by my system, by the use of proper lenses, and as will be well understood from the general principles hereinafter explained, the most useful distortion desired in motion picture exhibition is an enlargement or, in effect, a "close-up" of certain limited parts of a scene. By my system this enlargement and close-up of limited parts is shown within the surrounding normal scene, instead of being shown separately as is usually the case.

My system is applicable either to the original making of the pictures or to their final projection. If used in the original making of the pictures, either when the picture is taken in a camera or when the projection print is made, a limited distortion or enlargement area will be present in the film itself and no special apparatus is necessary for the projector. Thus there are certain advantages in having the localized enlargement present in the final projection film itself. On the other hand it may not be desirable in many cases to distort or enlarge images on the original camera negative as it may be undesirable in all cases to show the film with such localized enlargement. The use of my system in connection with the printing of projection films may thus have all the desirable advantages. The original film may be taken in the ordinary manner in a camera and without any parts being distorted or enlarged, so that the projection prints may always be obtainable without showing such distortion. By the use of my special system in the printing machine, localized distortions or enlargements may be obtained as desired, and in as many different manners as desired, all without permanently changing the initial film.

Wherever my system is used, it characteristically includes the use of a small distorting lens mounted upon a suitable invisible support, the lens being of such a size and so placed relatively to the film and the main objective, that the "view" of the film image taken or formed by the objective includes a localized distorted or magnified part of the original field, and a normal view of the remaining surrounding parts of the original field. The result is a distortion or enlargement or "close-up" located within the surrounding normal image.

The invisible support for the small distorting lens need be only such a support as will not be visible in the final composite image produced. Preferably I mount the lens upon a transparent sheet or plate, such for instance as a plate of optical glass, although I have used an ordinary sheet or fairly heavy celluloid with good effect.

The following detailed description sets out the different manners of using my system, typical and illustrative of the invention, and reference for this purpose is had to the accompanying drawings, in which:

Fig. 1 is a view showing a normal scene as it may appear either upon a film or upon a projection screen;

Fig. 2 shows the same with the inserted enlargement herein described;

Fig. 3 is a diagram in side elevation showing how my system is used in a projector;

Fig. 4 is a front elevation diagram showing the same;

Fig. 5 is a view similar to Fig. 3 showing the application of my system to a printing machine;

Fig. 6 is a view similar to Fig. 3 showing the application of my system to a camera; and Fig. 7 is an enlarged section of the lens.

Referring first to Figs. 3 and 4 I show therein a film 10 which travels by the aperture plate 11 having aperture 12 therein. For the purpose of the present part of the description we will suppose that film 10 is an ordinary film having a normal scene upon it such as is depicted in Fig. 1.

The objective lens of the projector is illustrated at 13, the film being illuminated from the right, in any usual manner, and the objective projecting the film image onto the projection screen towards the left in Fig. 3.

Mounted preferably upon the aperture plate or any other suitable part of the projector apparatus, and preferably fairly close to the film 10, I place a suitable invisible lens support, here shown as a plate of glass 14. This glass plate 14 carries the distorting or enlarging lens 15 directly upon it, and if so desired the lens may be integral with the glass plate, although it may be separately formed and suitably cemented to the glass plate. For purposes of localized or limited enlargement, and with the lens 15 placed in the relative position illustrated, this lens will be a positive lens. Its size depends upon the area desired to be enlarged; but normally lens 15 will be substantially smaller than the film "frame" or aperture 12; so that the lens 15 will affect only a limited part of the film image. Different and substitutable carrier plates 14 may be equipped with lenses 15 of different shapes and sizes to obtain different effects.

In order that the lens 15 may be moved to show a distortion or enlargement of certain selected parts of the film picture which may be relatively in motion, the plate 14 with its supported lens is mounted so as to be movable; and preferably it may be mounted and guided so that the lens can easily be made to follow movements of the image parts desired to be enlarged. For instance, suppose that an enlargement is desired of persons appearing in a scene and that those persons are in movement. From a consideration of the motion picture film, a cam slot 20 may be laid out and formed in a plate 21 which is attachable to the aperture plate 11. A pin 22 may be mounted upon or set in the glass plate 14, and the playing of this pin in the properly cut slot 20 will cause plate 14 and lens 15 to be guided in the desired line of movement when the plate is moved by hand. For convenience of hand movement of the plate a handle is provided at 23. A support at one point for the plate at the pin 22, and any other suitable plate support at any other point will cause the plate and its lens to be guided accurately through the predetermined line of movement. The second point of support may be provided in any simple manner, as for instance by supporting the plate with a long swinging arm 25.

The use of the device, and the general effect of the system, will be very readily understood from what I have now said. Presuming that the film has been taken in the ordinary manner and shows a normal view, then when in the projection of the film it is desired to show a temporary enlargement or other distortion of limited portions of the film, the glass plate with its lens is moved to bring the lens opposite the parts desired to be enlarged and then further movement of the plate causes the lens to follow the parts desired to be enlarged. The image "viewed" by projector lens 13, and projected by that lens onto the screen, will be as illustrated in Fig. 2. As soon as the occasion for enlargement has ceased, the glass plate may be moved far enough one way or the other to move the lens away from the film, leaving only the plain glass plate in front of the film, or the plate may be removed entirely from the machine when its use is finished.

Fig. 5 shows how my system may be applied to a projection printer. In this figure lens 13a is the projection printer lens that casts the image of film 10 onto the fresh film 10a. Film 10 may be in appearance like that shown in Fig. 1 and film 10a will upon development appear as shown in Fig. 2. Then the film 10a may be used in any ordinary projection machine to obtain the effect desired.

Fig. 6 shows the application of my system to a camera. Here the lens 13b is the objective of the camera, casting an image upon the film 10a through the interposed lens 15b. If limited enlargement is the distortion desired, then in the camera the lens 15b will be a minus lens instead of a positive lens as in the previously described arrangement. Using the system as applied to a camera the original film will then show as illustrated in Fig. 2; and ordinary prints from this film may then be run in ordinary projectors to obtain the desired effects.

I claim:

An apparatus for producing motion pictures comprising in combination a film support for a picture film, a lens having its field of view such as to embrace the whole of a film picture, a transparent lens-supporting plate between said lens and film, a second lens mounted on the said transparent lens-supporting plate and covering only a part of the film picture in the field of view of the first-mentioned lens, and means comprising a cam guide for guiding the second-mentioned lens in a predetermined path in front of the first-mentioned lens.

In witness that I claim the foregoing I have hereunto subscribed my name this 7th day of June, 1927.

LORENZO del RICCIO.